(12) United States Patent
Lam et al.

(10) Patent No.: US 9,603,086 B2
(45) Date of Patent: *Mar. 21, 2017

(54) SMART MANAGEMENT OF BACKGROUND NETWORK CONNECTIONS BASED ON HISTORICAL DATA

(71) Applicant: Apple Inc., Cupertino, CA (US)

(72) Inventors: Andrew C. Lam, Los Altos, CA (US); Ray Ling Chang, Sunnyvale, CA (US); Steven Douglas Parker, San Francisco, CA (US); Amit K. Vyas, San Jose, CA (US); Joshua V. Graessley, Sunnyvale, CA (US); John Iarocci, Los Gatos, CA (US); Darren Litzinger, Los Gatos, CA (US); Justin Wood, Sunnyvale, CA (US); Matthew Scott Klahn, San Francisco, CA (US); Daniel B. Pollack, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/164,087

(22) Filed: Jan. 24, 2014

(65) Prior Publication Data

US 2014/0365642 A1    Dec. 11, 2014

Related U.S. Application Data

(63) Continuation-in-part of application No. 13/913,113, filed on Jun. 7, 2013.

(51) Int. Cl.
*H04W 76/00* (2009.01)
*H04W 48/18* (2009.01)
(Continued)

(52) U.S. Cl.
CPC ......... *H04W 48/18* (2013.01); *H04W 36/245* (2013.01); *H04W 36/26* (2013.01);
(Continued)

(58) Field of Classification Search
CPC ......... G06F 21/51; H04L 12/14; H04L 12/66; H04L 63/20; H04L 65/1069; H04L 67/325;
(Continued)

(56) References Cited

U.S. PATENT DOCUMENTS 6,157,941 A    12/2000   Verkler et al.
6,877,037 B1   4/2005    Adacjo
(Continued)

FOREIGN PATENT DOCUMENTS

CN          1722693        12/2011
KR     10-2004-0028956      4/2004

OTHER PUBLICATIONS

International Search Report and Written Opinion of the International Searching Authority, PCT Application Serial No. PCT/US2013/055333, Nov. 28, 2013, 10 pp.

(Continued)

*Primary Examiner* — Le Luu
(74) *Attorney, Agent, or Firm* — Fish & Richardson P.C.

(57) ABSTRACT

In some implementations, a network daemon can manage access to a mobile device's network interface. The network daemon (e.g., network connection managing process) can monitor the condition of the mobile device's network connection on one or more interfaces. The network daemon can monitor many conditions on the mobile device. The network daemon can receive background networking requests from network clients (e.g., processes, applications) that specify criteria for initiating a network connection. The network daemon can then smartly manage network connections
(Continued)

taking into account network conditions, mobile device conditions and/or client criteria received in the client request. This can help reduce battery life impact, memory usage, likelihood of call drops, data usage cost, and load on network operators.

21 Claims, 4 Drawing Sheets

(51) Int. Cl.
| | |
|---|---|
| *H04W 36/24* | (2009.01) |
| *H04W 36/26* | (2009.01) |
| *H04W 36/36* | (2009.01) |
| *H04W 76/02* | (2009.01) |
| H04W 36/00 | (2009.01) |
| H04W 8/18 | (2009.01) |

(52) U.S. Cl.
CPC .......... *H04W 36/36* (2013.01); *H04W 76/00* (2013.01); *H04W 76/02* (2013.01); *H04W 8/18* (2013.01); *H04W 36/0011* (2013.01)

(58) Field of Classification Search
CPC ..... H04W 36/30; H04W 48/18; H04W 48/20; H04W 74/0866; H04W 76/027; H04W 76/02; H04W 8/18; H04W 36/245; H04W 36/26; H04W 36/36; H04W 36/0011; H04W 76/00
See application file for complete search history.

(56) References Cited

U.S. PATENT DOCUMENTS

| | | | |
|---|---|---|---|
| 7,114,010 B2 | 9/2006 | Karaoguz et al. | |
| 7,569,810 B1 | 8/2009 | Troxler et al. | |
| 7,580,397 B2 | 8/2009 | Arai et al. | |
| 7,606,602 B2 | 10/2009 | Zhang et al. | |
| 8,351,892 B2 | 1/2013 | Deng | |
| 8,655,319 B2 | 2/2014 | Clarke et al. | |
| 8,897,152 B1* | 11/2014 | Caceres ............... | H04W 36/30 370/252 |
| 8,948,810 B2 | 2/2015 | Centoza et al. | |
| 2004/0128382 A1 | 7/2004 | Shimoda | |
| 2005/0181734 A1 | 8/2005 | Coutts et al. | |
| 2005/0256968 A1 | 11/2005 | Johnson | |
| 2006/0282518 A1 | 12/2006 | Karaoguz et al. | |
| 2006/0282519 A1 | 12/2006 | Trevathan et al. | |
| 2007/0104158 A1 | 5/2007 | Liang et al. | |
| 2007/0276931 A1 | 11/2007 | Mahdavi et al. | |
| 2008/0025278 A1* | 1/2008 | Hoecker ............... | H04W 76/02 370/338 |
| 2010/0002582 A1* | 1/2010 | Luft .................. | H04W 74/0866 370/230.1 |
| 2010/0017861 A1 | 1/2010 | Krishnaswamy et al. | |
| 2010/0115048 A1* | 5/2010 | Scahill .................. | H04L 67/325 709/213 |
| 2011/0040867 A1 | 2/2011 | Kalbag | |
| 2011/0045763 A1 | 2/2011 | Mohanty | |
| 2011/0081911 A1* | 4/2011 | Silver ..................... | H04L 12/66 455/445 |
| 2011/0183723 A1 | 7/2011 | Kakii | |
| 2011/0183726 A1 | 7/2011 | Deng | |
| 2011/0230194 A1 | 9/2011 | Okuda | |
| 2011/0231547 A1 | 9/2011 | Yang et al. | |
| 2011/0268089 A1 | 11/2011 | Jaynes et al. | |
| 2012/0089845 A1* | 4/2012 | Raleigh .................. | H04L 12/14 713/176 |
| 2012/0258687 A1 | 10/2012 | Limont et al. | |
| 2012/0324568 A1* | 12/2012 | Wyatt .................... | G06F 21/51 726/13 |
| 2014/0044007 A1* | 2/2014 | Smadi .................. | H04W 48/20 370/254 |
| 2014/0052774 A1 | 2/2014 | Pollack et al. | |
| 2014/0087765 A1 | 3/2014 | Jaynes et al. | |
| 2014/0162629 A1 | 6/2014 | Tipton et al. | |
| 2014/0171065 A1* | 6/2014 | Graessley ........... | H04W 76/027 455/426.1 |
| 2014/0365642 A1* | 12/2014 | Lam ..................... | H04W 48/18 709/224 |
| 2014/0365673 A1* | 12/2014 | Vyas .................. | H04L 65/1069 709/228 |
| 2014/0378131 A1 | 12/2014 | Rui | |
| 2015/0128205 A1* | 5/2015 | Mahaffey ............... | H04L 63/20 726/1 |

OTHER PUBLICATIONS

Translation of Office Action of the Intellectual Property Office in Taiwanese Patent Application No. 102128544, file Aug. 8, 2013. 10 pages.
International Preliminary Report on Patentability of the International Searching Authority for International Patent Application Serial No. PCT/US2013/055333, filed Aug. 16, 2013. 8 pp.

* cited by examiner

SMART MANAGEMENT OF BACKGROUND NETWORK CONNECTIONS BASED ON HISTORICAL DATA

CROSS-REFERENCE TO RELATED APPLICATION

This application is a continuation-in-part of, and claims priority to, U.S. patent application Ser. No. 13/913,113, entitled "Smart Management of Background Network Connections," filed on Jun. 7, 2013, the entire contents of which is incorporated herein by reference.

TECHNICAL FIELD

The disclosure generally relates to managing network connections on a computing device.

BACKGROUND

Processes (e.g., applications) running on a computing device often require a network connection to download or upload (send, receive) data from network resources. Sometimes processes will wait for specific conditions to be met before attempting to make a network connection. Sometimes processes will attempt to make a network connection without checking the condition of the computing device or the state of the network. Computing resources of the computing device can be wasted (e.g., battery depleted) when the processes attempt to make a network connection without knowing the state of the network and/or the computing device.

SUMMARY

In some implementations, a network daemon can manage access to a mobile device's network interface. The network daemon (e.g., network connection managing process) can monitor the condition of the mobile device's network connection. The network daemon can monitor many conditions on the mobile device. The network daemon can receive background networking requests from network clients (e.g., processes, applications) running on the mobile device that specify criteria for initiating a network connection. The network daemon can create a network connection in response to receiving a background network request based on the network conditions, mobile device conditions and/or client criteria received in the client request.

Particular implementations provide at least the following advantages: Individual client developers are no longer required to implement network and device monitoring routines within individual client processes. Management of network connections is centralized in the network daemon. Memory usage is reduced as client processes can shut down while waiting for a network connection. This can help reduce battery life impact as network tasks can be delayed based on conditions of network connections, mobile device (such as whether connected to a power source), and/or other client criteria. Likelihood of call drops may be reduced by preventing background networking during voice calls. Data usage costs may be reduced by taking into account monthly data budgets. Load on network operators may be reduced by taking into account peak hours in a day.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
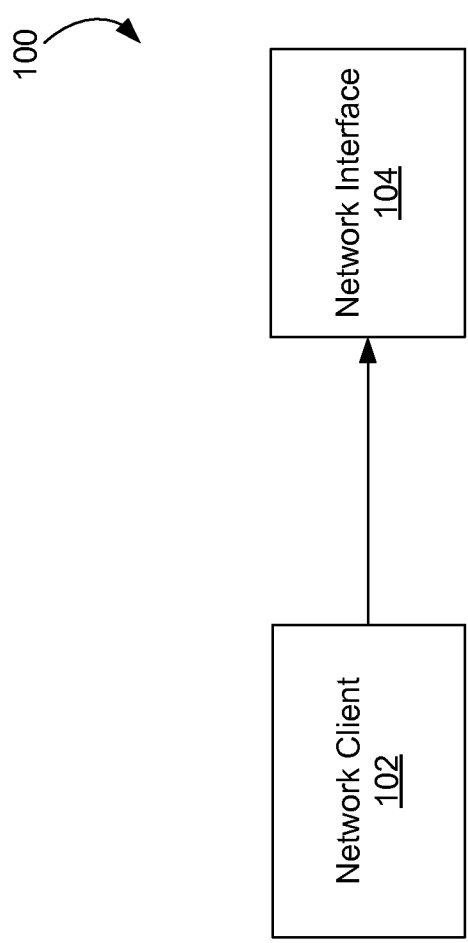
FIG. 1 illustrates an example of a typical system for allowing a network client to access a network interface.

FIG. 1 illustrates an example of a typical system 100 for allowing a network client to access a network interface. For example, system 100 can be implemented on a mobile computing device. System 100 can be configured to allow a network client 102 to access a network interface 104 of the mobile device. Network client 102 can be an application or process running on the mobile device, for example.

Network client 102 can be configured to connect to network interface 104 when certain conditions are met. For example, if network client is an application, the developer of the application can write code (software instructions) to determine when various conditions are met. For example, the network client can be configured to connect (or not connect) to the network interface based on the amount of charge in the battery of the mobile device. The network client can be configured to connect based on the type of network connection (e.g., Wi-Fi, cellular) that the mobile device is currently using, for example.

While this approach can provide for a network client that can intelligently connect to a network interface, each network client on the mobile device must be individually configured (e.g., programmed) to monitor conditions of the network interface and/or conditions of the mobile device to determine when to initiate a network connection. Moreover, the network client must remain active (e.g., resident in memory) so that the network client can continue monitoring these conditions to determine when to connect to the network. Furthermore, the network client cannot benefit from the network or device condition information detected and/or collected by other network clients.

Figure 2:
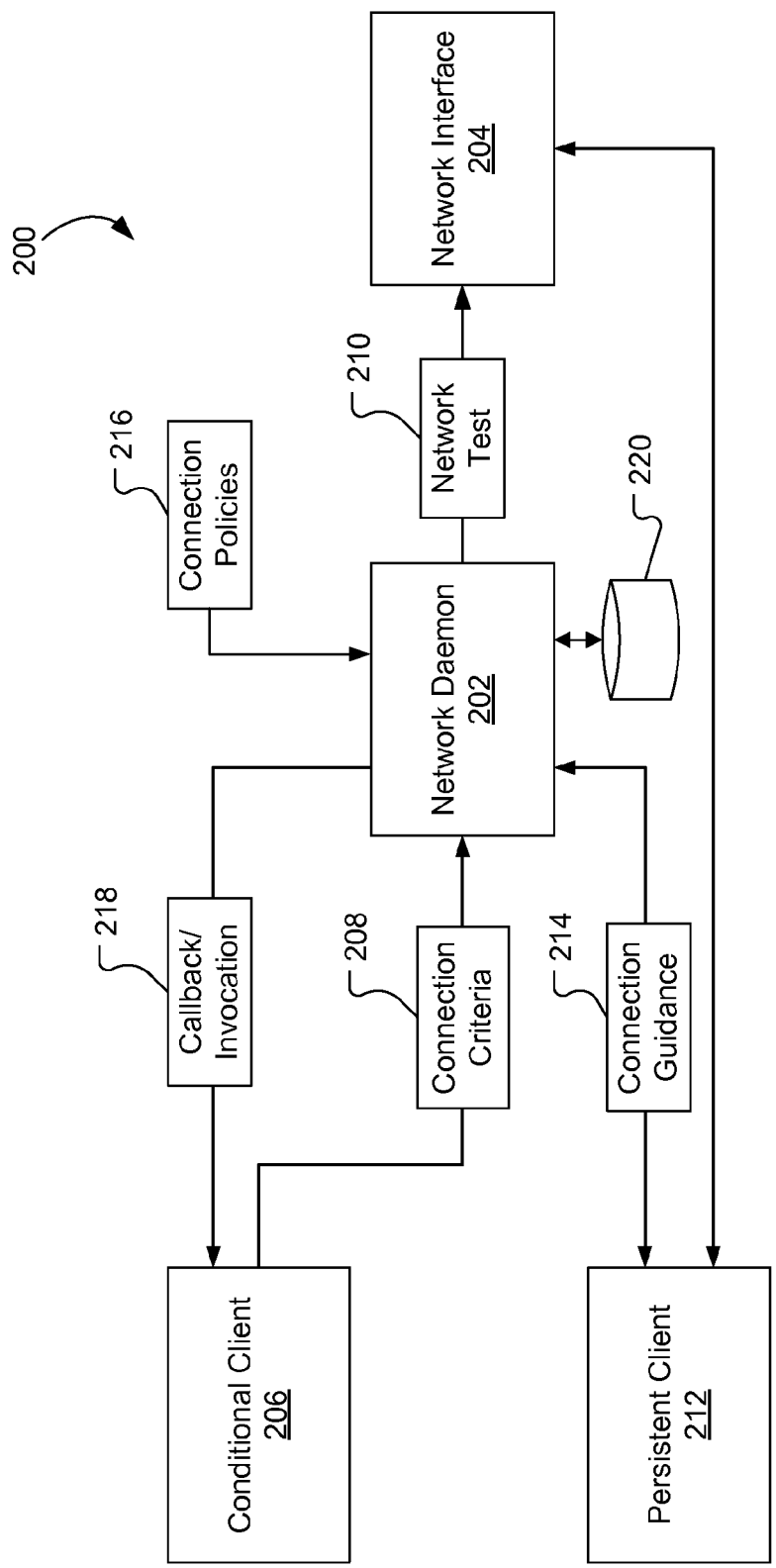
FIG. 2 illustrates an example system for managing conditional network connections.

FIG. 2 illustrates an example system 200 for managing conditional network connections. For example, system 200 can be implemented on a mobile computing device. In some implementations, system 200 can include network daemon 202. For example, network daemon 202 can be a process that manages access to network interface 204 on the mobile device based on the condition of the mobile device and/or network connection. In some implementations, network daemon 202 can establish network connections for background network jobs. For example, when a user initiates a network connection (e.g., invokes a web browser in the foreground), an attempt is made by the mobile device to make the network connection immediately without considering other factors. When an application or process requests a background network connection that is not related to an immediate user request, the background network connection can be deferred and established as a background task of the mobile device. For example, background network connections can be made opportunistically based on the current conditions of the mobile device and/or current conditions of the network, a described further below, instead of immediately as a foreground task.

In some implementations, network daemon 202 can initiate network connections for conditional clients. For example, a conditional client can be a network client that requests that the network daemon 202 establish a background network connection based on conditions or criteria specified by the conditional client when making the request. The conditional network client can request a background network connection to perform a deferrable task, for example.

In some implementations, conditional client 206 can send connection criteria 208 to network daemon 202 in a request for a background network connection. For example, the connection criteria 208 can include a time interval (e.g., start time, end time) during which the network connection should be established. Connection criteria 208 can include a job size (e.g., the amount of data to be sent or received through the network connection). Connection criteria 208 can include an indication (e.g., a flag, toggle, true, false) that a cellular connection can be used for the network connection. If connection criteria 208 indicate that a cellular connection is not allowed, the network daemon 202 will not establish a network connection over a cellular connection for the request. Connection criteria 208 can indicate that the mobile device must be connected to an external power source. For example, if the connection criteria 208 indicate that external power is required, then network daemon 202 will not establish a network connection for the request if the mobile device is not connected to an external power source.

In some implementations, once conditional client 206 transmits the background network connection request 208 to network daemon 202, conditional client 206 can shut down or be suspended until a network connection that satisfies the network request can be established. For example, the conditional client 206 can be suspended such that the state of the conditional client is stored in persistent memory and the conditional client is removed from the volatile (e.g., runtime) memory of the mobile device. Thus, computing resources (e.g., memory, battery, CPU cycles, etc.) are not wasted running the conditional client 206 as the conditional client 206 is waiting for a network connection.

In some implementations, when network daemon 202 receives background network connection request 208 (e.g., including connection criteria) from conditional client 206, network daemon 202 can store the background network connection request in a repository of network requests 220. For example, the background network connection request can include the client specified connection criteria. The background network connection request can include information identifying the conditional client 206 that can be used to call back the conditional client 206 when the requested network connection is established. The repository of network requests 220 can include background network connection requests from multiple clients. For example, the repository 220 can include a mapping of client identification information (e.g., process id, handle, etc.) to request information for each client. Thus, when the network daemon 202 determines that a client background network connection request can be fulfilled and a network connection established for the conditional client, the network daemon 202 can use the client identification information to call back the conditional client.

In some implementations, network daemon 202 can monitor network conditions to determine when to establish a network connection for a conditional client. For example, network daemon 202 can receive information from a radio transmitter on the mobile device that indicates which wireless network (e.g., Wi-Fi, cellular, 2G, 3G, LTE, EDGE, etc.) is currently connected to the mobile device and a wireless network signal strength for the connection.

In some implementations, network daemon 202 can monitor network connections of applications and other processes on the mobile device to determine network conditions. For example, network daemon 202 can monitor packet and/or data transmission rates between a network connected application and the network to estimate network throughput or to determine problems with the network.

In some implementations, network daemon 202 can compare the network traffic of one process to the network traffic of another process to distinguish between types of network problems. For example, if one process has a good connection to a server on the network and another process has a bad connection to a server on the network, then network daemon 202 can determine that the problem is with the server (the problem is with the individual process) and not with the network connection. However, if both processes have problems connecting to their respective network servers, then the network daemon 202 can determine that the mobile device has a bad Wi-Fi or cellular connection, for example.

In some implementations, if the mobile device has no active network connections for network daemon 202 to monitor, network daemon 202 can initiate a network connection to determine network status. For example, when network daemon 202 is determining whether to create a network connection for a conditional client, network daemon 202 can test the network connection 210 by sending a packet or a message (e.g., a ping) through network interface 204. In some implementations, network daemon 202 can test the network connection 210 by establishing a network connection for a conditional client that is waiting to perform a small job. Network daemon 202 can, for example, create a network connection for a small sized job of conditional client network request and monitor the network connection when the conditional client uses the network connection.

In some implementations, network daemon 202 can receive connection guidance from other processes running on the mobile device. For example, network daemon 202 can receive connection guidance from persistent network client 212. Persistent network client 212 can be an application, service, or process running on the mobile device that requires or maintains a constant or near constant connection to a network server. Thus, persistent network client 212 is in a position to provide information to network daemon 202 about the condition of the network connection.

In some implementations, persistent network client 212 can register with network daemon 202 to provide connection guidance 214 to network daemon 202. For example, persistent client 212 can register with network daemon 202 by providing network daemon 202 an identifier or handle that network daemon 202 can use identify persistent client 212 and request connection guidance from persistent client 212. For example, connection guidance 214 can include status information, such as "didn't try," "unable to connect," and/or an identification of the interface (e.g., cellular, Wi-Fi, etc.) to which persistent client 212 is currently connected.

In some implementations, network daemon 202 can monitor device conditions to determine when to establish a network connection for a conditional client. For example, network daemon 202 can use various utilities, functions or services of the mobile device to determine the condition of the mobile device. For example, network daemon 202 can request and receive from a service of the mobile device battery charge level information (e.g., 90% charge, 26% charge, etc.). Network daemon 202 can determine whether the mobile device is currently connected to an external power source or is running on an internal battery. Network daemon 202 can determine whether the mobile device is experiencing a thermal event (e.g., operating temperature above a maximum temperature value). Network daemon 202 can determine if the user is currently using the mobile device, in a voice call, if the Wi-Fi or cellular radio is currently being used and/or if the display screen of the mobile device is currently turned on. Network daemon 202 can request and receive power budget (e.g., an amount of battery electricity) and/or cellular data budget (e.g., an amount of cellular data) information for the current day and/or time of day.

In some implementations, network daemon 202 can be configured with connection policies 216 that can be used to determine when to establish a network connection for a conditional client. In some implementations, connection policies 216 can include general policies or preconditions that must be met before a client connection request is processed. For example, general policies or preconditions can include a requirement that the mobile device is currently not being used by the user. The general policies can include a requirement that the mobile device is currently not experiencing a thermal event, has a battery level above a specified threshold and/or is not experiencing network connectivity problems (e.g., as indicated by network monitoring, network test, connection guidance, etc.). The general policies can include a requirement that a network connection is not established during times of day when peak network activity occurs. For example, the mobile device can be configured to randomize or adjust the timing of network connections to avoid times when peak network activity typically occurs. Thus, network daemon 202 may determine that a background network connection request cannot be satisfied (a network connection cannot be established) because the time of day, network conditions and/or device conditions described in the general policies or preconditions.

In some implementations, connection policies 216 can include policies for handling background network connection requests (e.g., including connection criteria) from conditional clients. For example, if the general policies or preconditions described above indicate that network daemon 202 can establish a network connection for a conditional client, then network daemon 202 can process the background network connection request received from conditional client 206 according to the connection request policies and the connection criteria. For example, connection criteria can include a time interval (e.g., start time, end time) during which the network connection should be established, a job size (e.g., indicating the amount of data to transmit), if a cellular data connection can be used, whether a persistent connection is required and/or whether the mobile device should be plugged in to an external power supply.

In some implementations, the connection criteria can be mapped to a policy table (e.g., stored in repository 220) that can be used to determine whether to establish a background network connection for the client request based on the connection criteria. An example policy table is illustrated below in Table 1.

TABLE 1

|  | T1 | T2 | T3 | T4 | T5 |
|---|---|---|---|---|---|
| <100 kb | Power & wifi | Power \|\| wifi | Power \|\| wifi | Power \|\| wifi \|\| (cell&good quality)\|\| (cell&radios active) | No restrictions |
| <5 MB | Power & wifi | Power & wifi | Power \|\| wifi | Power \|\| wifi \|\| (cell&good quality)\|\| (cell&radios active) | Power \|\| wifi \|\| (cell&good quality)\|\| (cell&radios active) |
| <50 MB | Power & wifi | Power & wifi | Power | Power \|\| wifi | Power \|\| wifi \|\| (cell&good quality)\|\| |
| >=50 MB | Power & wifi | Power & wifi | Power & wifi | Power & wifi | Power & wifi |

In some implementations, the time interval connection criteria received in the background network request can be divided into a number of time periods. For example, if the time interval is five days, each time period T1, T2, T3, T4 and T5 can each correspond to one day where T1 is the first day and T5 is the last day. The job size received in the connection criteria can determine which policy table row applies. For example, if the job size is less than 100 kb, then the first row holds the policies to be applied over the sequence of time periods T1 -T5. If the job size is greater than 5 MB but less than 50 MB, then the third row holds the policies to be applied over the sequence of time periods T1-T5.

In some implementations, as each time period passes (e.g., T1, T2, T3, etc.) the connection policies become more permissive. For example, as the current time nears the end of the connection criteria time interval, the connection policies become more permissive so that the conditional client will be more likely to receive a network connection. For example, if the job is less than 100 kb, then during the first time period T1, the mobile device must be connected to external power (power) and also connected to a Wi-Fi connection for the network connection to be established for the conditional client.

During the second time period T2 and third time period T3, the requirements are relaxed a little in that only one of power or Wi-Fi is required before a connection is established for the conditional client. For example, the mobile device can be connected to external power and connected to the network over a cellular data connection. The mobile device can be running on internal battery power and connected to a Wi-Fi network connection.

During the fourth time period T4, the connection requirements are relaxed further such that a connection can be established when the mobile device is on external power or Wi-Fi or on a good quality cellular connection (cell & good quality) or on cellular where the cellular radio transmitters are active (cell & radios active).

In some implementations, a good quality cellular connection can be determined by network daemon 202 by monitoring network transmissions to and from the mobile device, as described above. In some implementations, a good quality cellular connection can be determined by receiving connection guidance from a persistent network client. For example, if persistent client 212 indicates that it was unable to connect, then network daemon can interpret the connection guidance as an indication that the cellular connection is not good. However, if network daemon 202 determines that another client's network connection is good, then network daemon 202 can ignore the connection guidance as it is likely that persistent client 212 is experiencing network problems with its specific connection (e.g., a firewall, server, or other problem specific to persistent client 212).

During the fifth period T5, the connection requirements can be relaxed such that the conditional client's network request will be fulfilled before the end of the requested time interval. For example, during the fifth time period the connection policies can indicate that there are no restrictions on establishing a network connection for the conditional client.

In some implementations, network daemon 202 can determine whether to establish a network connection for conditional client 206 based on a power budget for the mobile device. For example, the mobile device can be configured with a power budget that indicates the amount of battery power that can be used during different days of the week and/or hours of the day. The power budget can indicate, for example, a percentage of battery power that can be used during each hour of the day. In some implementations, if establishing a connection to fulfill a conditional client request will use enough battery power to exceed the power budget, then network daemon 202 will not establish the network connection for the conditional client. For example, network daemon can determine how much battery power a network request will consume based on the size of the job (as indicated in the client provided connection criteria) and the power cost per unit (e.g., kb, MB, GB, etc.) of data transmitted associated with the particular cellular data connection or radio access technology (LTE, Edge, 2G, etc.) being used (as determined from empirical data).

In some implementations, the mobile device will not check the power budget when determining whether to establish a network connection for a conditional client when the mobile device is connected to an external power source. However, in addition to determining that the mobile device is connected to an external power source, the network daemon 202 can determine that, when connected to external power, the battery is above a minimum charge (e.g., 3%) or that the mobile device can maintain a positive charge once the network connection is established and being used. If the battery is not above the minimum charge or the mobile device cannot maintain a positive charge (e.g., charge the batteries and service the network connection), network daemon 202 can determine that the external power requirement for the network connection is not met and will not establish the network connection for the conditional client.

In some implementations, network daemon 202 can determine whether to establish a network connection for conditional client 206 based on a data budget for the mobile device. For example, the mobile device can be configured with a data budget that indicates an amount of cellular data that can be used during different days of the week and/or hours of the day. The power budget can indicate, for example, a percentage of the cellular data budget that can be used during each hour of the day. In some implementations, if establishing a connection to fulfill a conditional client request will use enough cellular data to exceed the data budget, then network daemon 202 will not establish the network connection for the conditional client. For example, network daemon can determine how much cellular data a network request will consume based on the size of the job (as indicated in the client provided connection criteria) and whether the mobile device is connected to the network over a cellular connection or a Wi-Fi connection. In some implementations, the mobile device will not check the data budget when determining whether to establish a network connection for a conditional client when the mobile device is connected to the network over Wi-Fi.

In some implementations, network daemon 202 can establish a network connection for a conditional client. For example, if, based on the preconditions, policies and budgets described above, the network daemon 202 determines that network conditions and mobile device conditions are good for establishing a network connection for the conditional client 206, then network daemon 202 will create the network connection.

In some implementations, network daemon 202 can use historical data to determine when to establish a network connection for a conditional client. In some implementations, the mobile device can monitor network connections over a period of time and store information (e.g., location, radio/network conditions, time of day) that describes the network conditions encountered by the mobile device. For example, the information can indicate when and where the mobile device encounters or connects to a Wi-Fi access point or when and where the mobile device encounters strong or weak cellular data signals. The mobile device can store the historical network conditions data in database 220, for example.

In some implementations, the network daemon 202 can use the historical network data to determine network access patterns. For example, based on the historical network data, the network daemon 202 can determine that the mobile device typically connects to a Wi-Fi connection between 9 am and 5 pm (e.g., when the user is at work) and between 7 pm and 8 am (e.g., when the user is at home). Based on the historical network data, the network daemon 202 can determine when or where the mobile device is likely to encounter a strong or weak cellular data connection.

In some implementations, the network daemon 202 can delay creating a network connection for a conditional client based on the determined network access patterns. For example, the network daemon 202 can determine based on the historical network access patterns whether the mobile device is likely to connect to a Wi-Fi network within the time interval specified in the conditional client's connection request. When the historical network access patterns indicate (e.g., predict) that the mobile device will likely encounter a Wi-Fi network within the specified time interval, then the network daemon 202 can delay creating the network connection until the predicted Wi-Fi network connection is available. Once a Wi-Fi network is detected by the mobile device, the network daemon 202 can create the requested network connection using the detected Wi-Fi network.

In some implementations, if a Wi-Fi connection is not detected near (e.g., within a threshold period of time) the predicted time, then the network daemon 202 can establish a network connection for the conditional client according to the network access request and the network policies described above. For example, if the historical network connection patterns indicate that a Wi-Fi connection is likely to be encountered at 9 am, then if at 9:10 am a Wi-Fi connection has not been detected, then the network daemon 202 will stop waiting for the predicted Wi-Fi connection and use the network connection request criteria and the network connection polices to determine when to establish a network connection to satisfy the network connection request. If a Wi-Fi network is not encountered within the time interval specified in the network connection request, then the network daemon 202 can establish the network connection according to column T5 of Table 1 so that the network connection request can be satisfied within the specified time interval.

In some implementations, once the network connection is established, network daemon 202 can call back 218 conditional client 206 and provide conditional client 206 with the network connection. For example, network daemon 202 can send a message 218 to conditional client 206 that includes an identifier or handle that identifies the network connection and allows conditional client 206 to interact with and/or transmit data through the established network connection. In some implementations, network daemon 202 can invoke conditional client 206 when the network connection is established for conditional client 206. For example, in some implementations, conditional client 206 can be suspended or terminated after conditional client 206 makes a background network connection request. Thus, part of callback 218 can include an invocation of the conditional client so that the conditional client can receive the callback message 218 and utilize the network connection handle to interact with the network connection.

In some implementations, network daemon 202 can pause or suspend an established network connection. For example, network daemon 202 can monitor the conditions on the mobile device while conditional client 206 is using the established connection. If network daemon 202 determines that the user has initiated a voice call or the display screen of the mobile device has been turned on, then network daemon 202 can determine that the user is using the mobile device, for example. If network daemon 202 determines that the user is using the mobile device, network daemon 202 can send a message to conditional client 206 requesting that conditional client 206 pause or suspend its transmission of data through the network connection.

In some implementations, if network daemon 202 determines that a network connection should not be established for conditional client 206, network daemon 202 can attempt to establish the network connection at a later time. For example, network daemon 202 can be configured with a time interval for checking whether the network connections identified by the requests in the background network connection request repository can be established. Network daemon 202 can check the network requests every five minutes, for example. In some implementations, network daemon 202 can determine whether the network requests in the repository can be satisfied in response to a trigger. For example, network daemon 202 can attempt to establish network connections for the requests in the repository in response to determining that the mobile device has connected to external power or has turned on the cellular radio transmitters, for example.

EXAMPLE PROCESS

Figure 3:
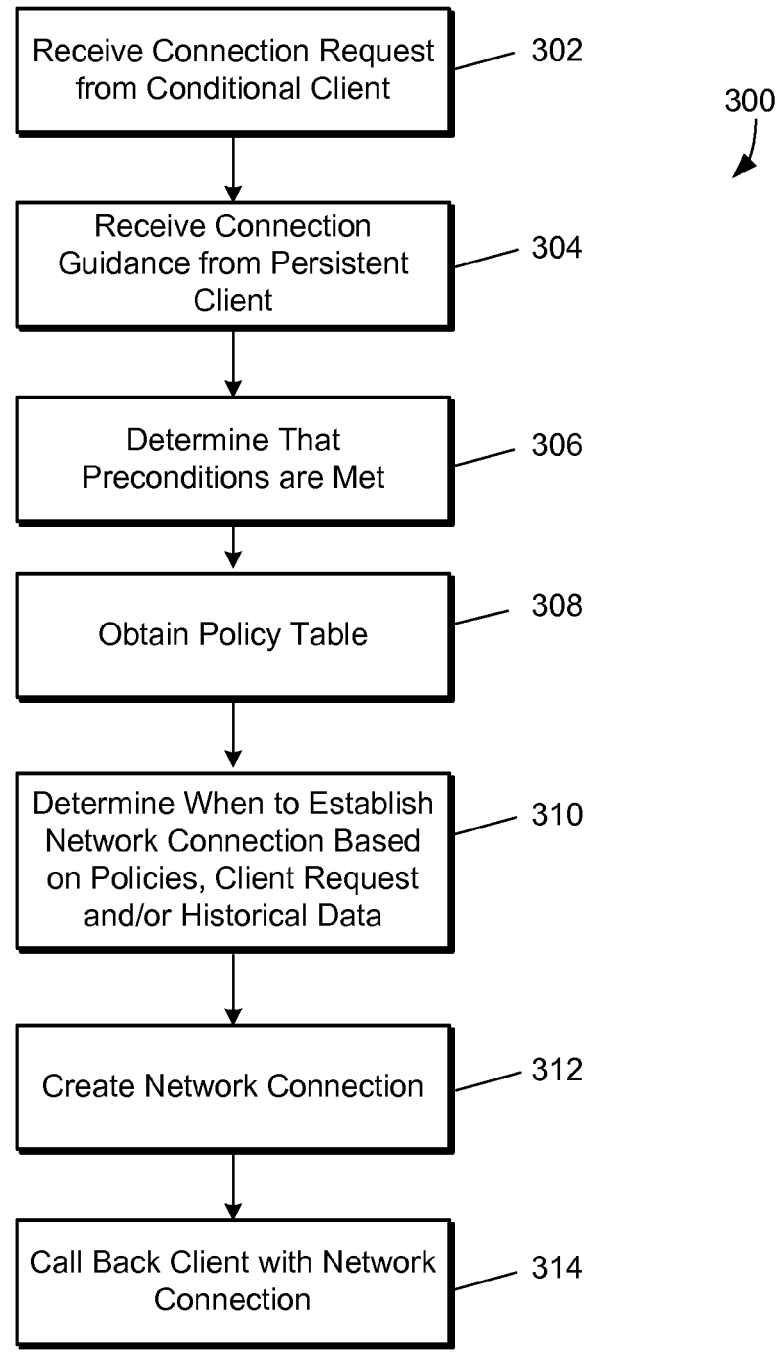
FIG. 3 is flow diagram of an example process for managing conditional network connections.

FIG. 3 is flow diagram of an example process 300 for managing conditional network connections. For example, process 300 can be performed to allow conditional network clients that need to perform background network tasks to make deferrable background network connection requests to a network daemon that will opportunistically establish a network connection for the conditional network client based on client defined connection criteria and the current mobile device conditions and the network conditions.

At step 302, a network daemon running on a mobile device can receive a background network connection request from a conditional client. For example, the network request can specify connection criteria that describe the network connection required by the conditional client, as described above. The conditional client can be terminated or suspended after the network daemon receives the request so that memory and CPU resources associated with the conditional client can be released to the mobile device.

At step 304, the network daemon can receive connection guidance from one or more persistent clients. For example, the network daemon can include an interface that allows persistent clients to register with the network daemon to provide network connection status. When the network daemon is determining whether to establish a network connection for a conditional client, the network daemon can request guidance from the registered persistent clients. The persistent clients can provide information describing the persistent client's current connection to the network. For example, the persistent client can indicate that the persistent client is not connected, did not try to connect or is connected to the network through using a particular radio access technology (2G, LTE, EDGE, etc.).

At step 306, the network daemon can determine that preconditions or general policies are met. For example, the network daemon can determine that the mobile device is not too hot (e.g., thermal conditions), that the mobile device is not currently being used by the user (e.g., not in a phone call, not using network data) and/or that the current time is not a peak network usage time, as described above.

At step 308, the network daemon can obtain connection policies defining policies for establishing a background network connection for a conditional client request. For example, the connection policies can be defined using a policy table that can specify network connection policies to be applied based on the client specified time interval and the client specified job size, as described above with reference to Table 1.

At step 310, the network daemon can determine when to establish a network connection for the conditional client based on the connection policies, the conditional client request and/or historical network data. For example, the conditional client request can include connection criteria that can be compared to the connection policies to determine when the network daemon can establish a network connection for the conditional client. The connection criteria (e.g., time interval) can be compared to historical network connection data to determine when the network daemon can establish a network connection for the conditional client using a predicted or expected Wi-Fi connection.

At step 312, the network daemon can create a network connection for the conditional client. For example, if analysis of the network policies, the client request, and/or historical network connection data indicate that a network connection can be established, the network daemon can create a new network connection for the conditional client. The new network connection can be identified by a handle or some other type of connection identifier.

At step 314, the network daemon can call back the conditional client with the network connection. For example, the network daemon can invoke the conditional client and send the network connection identifier to the conditional client so that the client can utilize the newly created network connection.

EXAMPLE SYSTEM ARCHITECTURE

Figure 4:
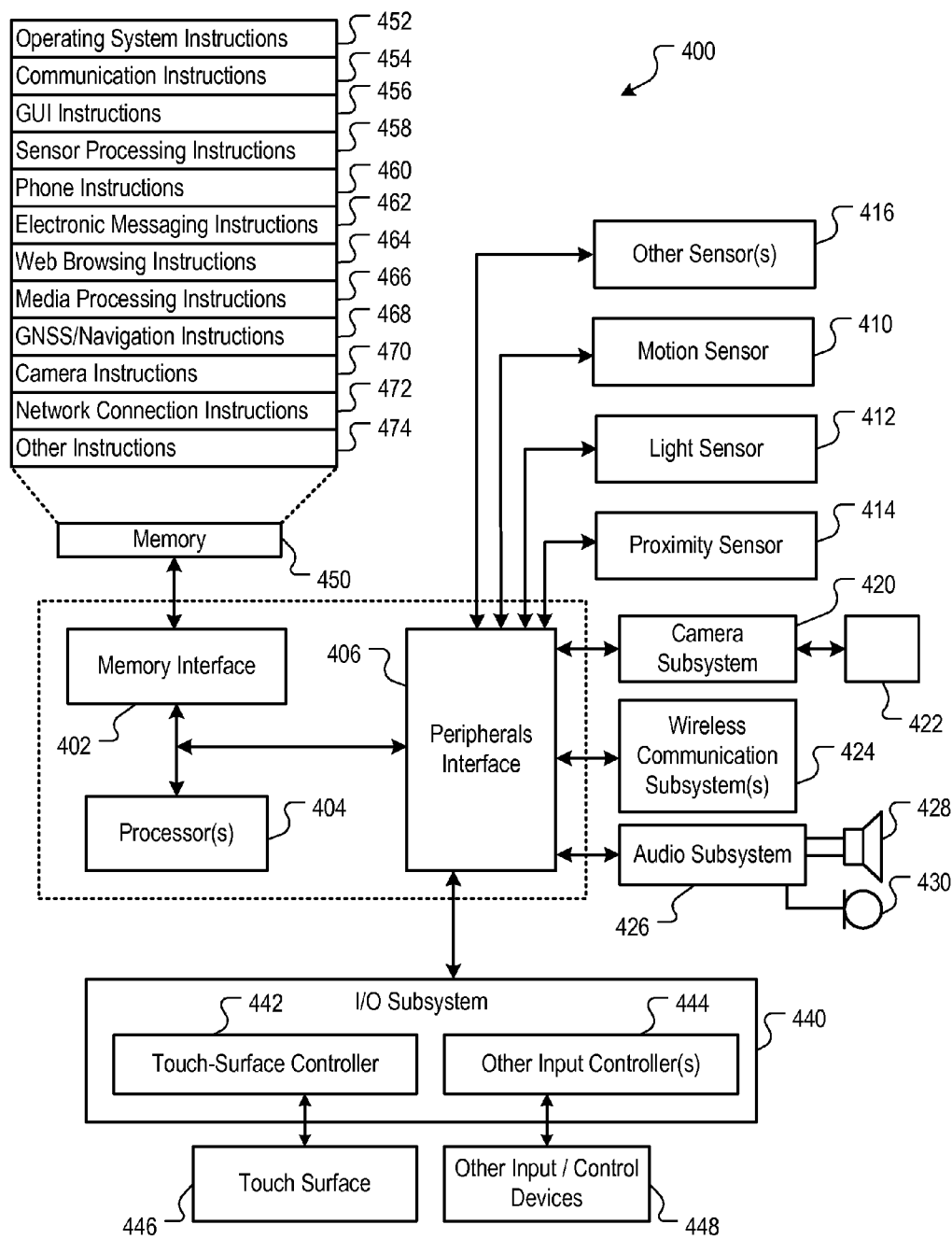
FIG. 4 is a block diagram of an example computing device that can implement the features and processes of FIGS. 1-3.

FIG. 4 is a block diagram of an example computing device 400 that can implement the features and processes of FIGS. 1-3. The computing device 400 can include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the computing device 400 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a global navigation satellite system (GNSS) (e.g., GPS receiver), a temperature sensor, a biometric sensor, magnetometer or other sensing device, to facilitate related functionalities.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips. The camera subsystem 420 and the optical sensor 422 can be used to collect images of a user to be used during authentication of a user, e.g., by performing facial recognition analysis.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which the computing device 400 is intended to operate. For example, the computing device 400 can include communication subsystems 424 designed to operate over a GSM network, a GPRS network, an EDGE network, a Wi-Fi or WiMax network, and a Bluetooth™ network. In particular, the wireless communication subsystems 424 can include hosting protocols such that the device 100 can be configured as a base station for other wireless devices.

An audio subsystem 426 can be coupled to a speaker 428 and a microphone 430 to facilitate voice-enabled functions, such as speaker recognition, voice replication, digital recording, and telephony functions. The audio subsystem 426 can be configured to facilitate processing voice commands, voiceprinting and voice authentication, for example.

The I/O subsystem 440 can include a touch-surface controller 442 and/or other input controller(s) 444. The touch-surface controller 442 can be coupled to a touch surface 446. The touch surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In one implementation, a pressing of the button for a first duration can disengage a lock of the touch surface 446; and a pressing of the button for a second duration that is longer than the first duration can turn power to the computing device 400 on or off. Pressing the button for a third duration can activate a voice control, or voice command, module that enables the user to speak commands into the microphone 430 to cause the device to execute the spoken command. The user can customize a functionality of one or more of the buttons. The touch surface 446 can, for example, also be used to implement virtual or soft buttons and/or a keyboard.

In some implementations, the computing device 400 can present recorded audio and/or video files, such as MP3, AAC, and MPEG files. In some implementations, the computing device 400 can include the functionality of an MP3 player, such as an iPod™. The computing device 400 can, therefore, include a 36-pin connector that is compatible with the iPod. Other input/output and control devices can also be used.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks.

The operating system 452 can include instructions for handling basic system services and for performing hardware dependent tasks. In some implementations, the operating system 452 can be a kernel (e.g., UNIX kernel). In some implementations, the operating system 452 can include instructions for managing conditional network connections for background network tasks. For example, operating system 452 can implement the conditional network connection management features as described with reference to FIGS. 1-3.

The memory 450 can also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions.

The memory 450 can store other software instructions 472 to facilitate other processes and functions, such as the conditional network connection management processes and functions as described with reference to FIGS. 1-3.

The memory 450 can also store other software instructions 474, such as web video instructions to facilitate web video-related processes and functions; and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 450 can include additional instructions or fewer instructions. Furthermore, various functions of the computing device 400 can be implemented in hardware and/or in software, including in one or more signal processing and/or application specific integrated circuits.

What is claimed is:

1. A method comprising:
   receiving a request from a client process executing on a mobile device, the request including one or more connection criteria, the one or more connection criteria specifying a time interval during which a network connection to a network should be established;
   obtaining historical network connection data by the mobile device, the historical network connection data indicating a time that the network will become available;
   determining, by the mobile device, that the time that the network will become available is within the time interval based on the one or more connection criteria and the historical network connection data; and
   in response to the determining, delaying establishing the network connection until the time the network is available,
   where the method is performed by one or more hardware processors.

2. The method of claim 1, further comprising:
   determining based on the historical network connection data that a Wi-Fi connection is likely to be encountered within the time interval specified in the one or more connection criteria.

3. The method of claim 1, wherein the one or more connection criteria specify the time interval as a start time and an end time.

4. The method of claim 3, further comprising:
   determining that the mobile device has not connected to a predicted Wi-Fi connection within a threshold period of time of the time as specified in the historical network connection data; and
   based on the determination, establishing a network connection based on the one or more connection criteria and one or more policies for determining that a network connection should be established.

5. The method of claim 4, further comprising:
   determining that the network connection should be established for the client process based on an energy budget for the mobile device.

6. The method of claim 4, further comprising:
   determining that the network connection should be established for the client process based on a data budget for the mobile device.

7. The method of claim 4, further comprising:
   receiving network connection guidance from one or more persistent network clients; and
   determining that the network connection should be established for the client process based on the received network connection guidance.

8. A non-transitory computer-readable medium including one or more sequences of instructions which, when executed by one or more processors, causes:
   receiving a request from a client process executing on a mobile device, the request including one or more connection criteria, the one or more connection criteria specifying a time interval during which a network connection to a network should be established;
   obtaining historical network connection data, the historical network connection data indicating a time that the network will become available;
   determining that the time that the network will become available is within the time interval based the connection criteria and the historical network connection data; and
   in response to the determining, delaying establishing the network connection until the time the network is available.

9. The non-transitory computer-readable medium of claim 8, wherein the instructions cause:
   determining based on the historical network connection data that a Wi-Fi connection is likely to be encountered within the time interval specified in the one or more connection criteria.

10. The non-transitory computer-readable medium of claim 8, wherein the connection criteria specify the time interval as a start time and an end time.

11. The non-transitory computer-readable medium of claim 10, wherein the instructions cause:
    determining that the mobile device has not connected to a predicted Wi-Fi connection within a threshold period of time of the time as specified in the historical network connection data; and
    based on the determination, establishing a network connection based on the one or more connection criteria and one or more policies for determining that a network connection should be established.

12. The non-transitory computer-readable medium of claim 11, wherein the instructions cause:
    determining that the network connection should be established for the client process based on an energy budget for the mobile device.

13. The non-transitory computer-readable medium of claim 11, wherein the instructions cause:
    determining that the network connection should be established for the client process based on a data budget for the mobile device.

14. The non-transitory computer-readable medium of claim 11, wherein the instructions cause:
    receiving network connection guidance from one or more persistent network clients; and
    determining that the network connection should be established for the client process based on the received network connection guidance.

15. A system comprising:
    one or more processors; and
    a computer-readable medium including one or more sequences of instructions which, when executed by the one or more processors, causes:
    receiving a request from a client process, the request including one or more connection criteria, the one or more connection criteria specifying a time interval during which a network connection to a network should be established;
    obtaining historical network connection data, the historical network connection data indicating a time that the network will become available;
    determining that the time that the network will become available is within the time interval based on the one or more connection criteria and the historical network connection data; and
    in response to the determining, delaying establishing the network connection until the time specified in the network is available.

16. The system of claim 15, wherein the instructions cause:
- determining based on the historical network connection data that a Wi-Fi connection is likely to be encountered within the time interval specified in the one or more connection criteria.

17. The system of claim 15, wherein the one or more connection criteria specify the time interval as a start time and an end time.

18. The system of claim 17, wherein the instructions cause:
- determining that a mobile device has not connected to a predicted Wi-Fi connection within a threshold period of time of the time as specified in the historical network connection data; and
- based on the determination, establishing a network connection based on the one or more connection criteria and one or more policies for determining that a network connection should be established.

19. The system of claim 18, wherein the instructions cause:
- determining that the network connection should be established for the client process based on an energy budget for the mobile device.

20. The system of claim 18, wherein the instructions cause:
- determining that the network connection should be established for the client process based on a data budget for the mobile device.

21. The system of claim 18, wherein the instructions cause:
- receiving network connection guidance from one or more persistent network clients; and
- determining that the network connection should be established for the client process based on the received network connection guidance.

* * * * *